June 18, 1963    H. R. MERIWETHER, JR., ETAL    3,094,578
METHOD AND APPARATUS FOR TREATING GLASS
Filed Nov. 18, 1959

Henry R. Meriwether, Jr., INVENTORS
Curtis A. Mewbourne,
Richard E. Warren
and Alfred E. Badger
BY Nobbe & Swope
ATTORNEYS : 3,094,578
Patented June 18, 1963

3,094,578
METHOD AND APPARATUS FOR TREATING GLASS

Henry R. Meriwether, Jr., and Curtis A. Mewbourne, Shreveport, La., and Richard E. Warren, Toledo, and Alfred E. Badger, Maumee, Ohio, assignors to Libbey-Owens-Ford Glass Company, Toledo, Ohio, a corporation of Ohio
Filed Nov. 18, 1959, Ser. No. 853,977
8 Claims. (Cl. 13—6)

The present invention relates to a method and apparatus for treating glass and more particularly to a method and apparatus for treating molten glass prior to its introduction into a working receptacle.

This is a continuation-in-part of our co-pending application Serial No. 499,434, filed April 5, 1955, now abandoned.

Although this invention is by no means restricted thereto, it has proved to be particularly valuable in connection with the continuous production of sheet glass and will be described in that connection here. In the present day manufacture of sheet or window glass, the batch is melted and the resultant molten glass refined in a continuous type tank furnace. The molten glass moves from the refining end of the tank into and through a so-called cooling or conditioning chamber and, from there, into a relatively shallow working receptacle or draw pot from which a ribbon of glass is continuously drawn. Molten glass supplied to the draw pot through the cooling chamber is preferably kept at a controlled temperature so that the glass in the draw pot has the desired viscosity for the drawing operation.

Certain difficulties have been encountered in maintaining the desired temperature at all points throughout the draw pot in prior known installations. Thus, because the walls at the exit end of the conditioning chamber, and the walls of the draw pot, have a tendency to cool the glass; and because glass has a tendency to flow in the centrally located areas more rapidly than near the walls, the glass in the central portion of the draw pot is normally hotter than the glass near the side walls.

In the past, various heating devices have been employed in an attempt to maintain uniformity of the temperature of the glass in the draw pot, but none of these has proved entirely satisfactory. For one thing most of the combustion heating devices of the prior art have caused convection currents which prevented proper control and introduced products of combustion which frequently caused top dirt losses.

It is the primary object of this invention to properly condition a moving stream of molten glass for working or drawing by selective temperature regulation before the glass reaches the forming zone of the working receptacle or draw pot.

Another object of this invention is to provide a special heating means for heating the glass flowing into the sides of the working receptacle near the entrance end thereof so that a uniform temperature may be maintained at the zone of formation.

A further object of this invention is to provide a type of heating means which applies heat directly in the molten glass at points on each side of the glass as it moves into the draw pot whereby a quantity of glass may be suitably treated by the action of heat before it is drawn into a glass sheet.

A further object is to provide a controlled uniform temperature of the glass in the zone of formation so that a better grade of sheet glass may be drawn at a greater speed of operation than has been heretofore possible.

Other objects and advantages of the invention will become more apparent during the course of the following description when taken in connection with the accompanying drawings.

In the drawings, wherein like numerals are employed to designate like parts throughout the same:

Figure 1:
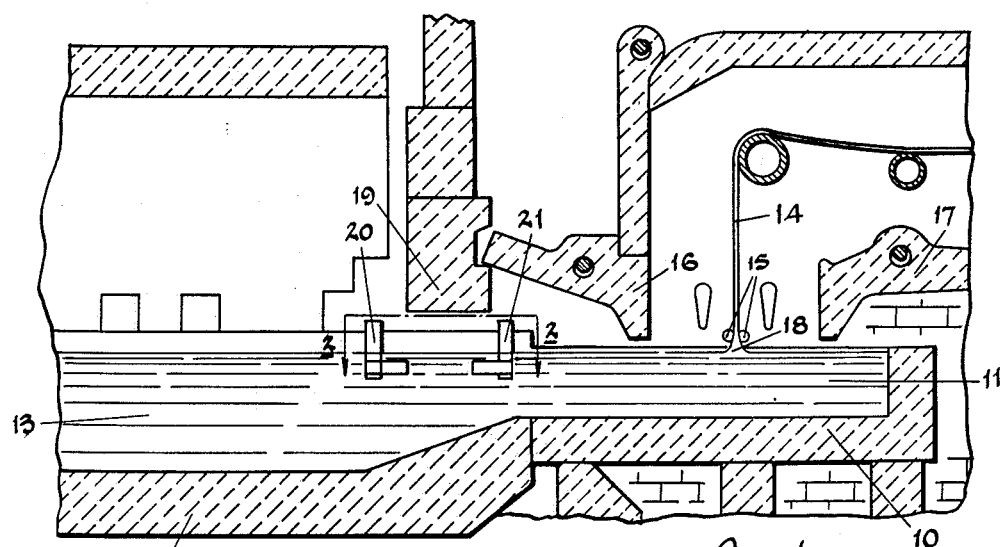
FIG. 1 is a longitudinal, vertical, sectional view through a draw pot and the end of a cooling chamber of a sheet glass furnace showing the heating means of this invention associated therewith.

The present invention is here disclosed in connection with a type of sheet glass drawing machine known in the art as the Colburn machine, and is particularly applicable to machines where the glass is drawn from a meniscus of controlled viscosity as is done in the ordinary window glass machines.

The sheet glass drawing apparatus herein illustrated includes a relatively shallow working receptacle or draw pot 10 containing a mass of molten glass 11, preferably supplied thereto from the exit end 12 of the cooling or conditioning chamber having conditioned molten glass 13 contained therein. A sheet 14 is continuously drawn from the mass 11, the said sheet being held to width by width maintaining knurls or similar edge engaging members 15. Arranged over the glass is a pair of lip tiles 16 and 17. The thickness and character of the sheet 14 is determined by the temperature and quality of the glass 11 which makes up the meniscus 18 at the surface of the molten glass in the draw pot and extending across the draw pot for a distance equal to the width of the sheet 14.

It is particularly important that the glass in the meniscus 18 is all at the same temperature in order that the drawn sheet may be of uniform thickness. Moreover, if excessive cooling is allowed near the width maintaining knurls, semi-solid gobs of glass often referred to as knots are formed which causes losses due to the fact that these gobs of glass must be removed and after removal it take some time to put the machine back into proper operation.

Due to the fact that the glass at the sides of the draw pot has a tendency to cool off faster than the glass at the center of the same, we have found it is necessary to add heat to the glass flowing along the side walls of the draw pot in order to compensate for the heat losses occurring through the walls thereof. It is also important to supply the heat within the glass and to provide means for supplying the heat that may be accurately controlled. According to this invention, the heat is supplied to the molten glass at a point near the exit end of the conditioning chamber and just ahead of the entrance end of the draw pot. In the apparatus shown in FIG. 1, there is an arch 19 which represents such a point, and the heat is preferably applied at points in the glass where it flows under this arch and near the side walls of said arch. Generally the glass in the draw pot is relatively shallow compared to the glass in the conditioning chamber as is shown in FIG. 1. This means that the amount of glass in the draw pot is comparatively small thereby making it more difficult to control variations of the temperature of the glass in said pot.

We have found that the heat losses through the side walls of the draw pot may be compensated for and the temperature in the draw pot accurately controlled by electrically heating the glass by passing an electric current through the molten glass flowing toward each side of the draw pot before it reaches the entrance end. The electric energy dissipated in the glass causes the glass to be heated by the Joule effect. This electric current is supplied to the molten glass by two pairs of similar electrodes 20 and 21. Especially good results have been obtained when the distance between the electrodes is about one foot and preferably the electrodes are spaced between about 8 and 18 inches.

Figure 2:
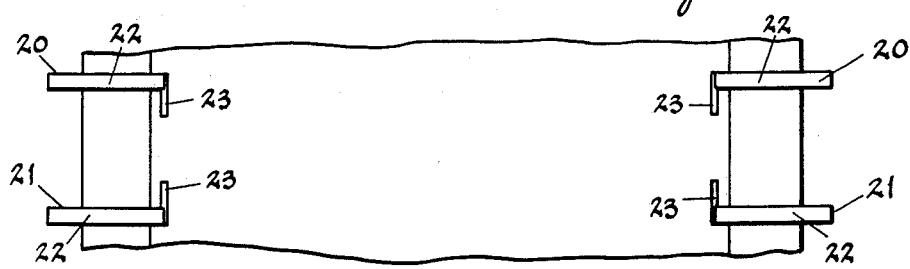
FIG. 2 is a fragmentary plan view taken substantially along the line 2—2 of FIG. 1.
Figure 3:
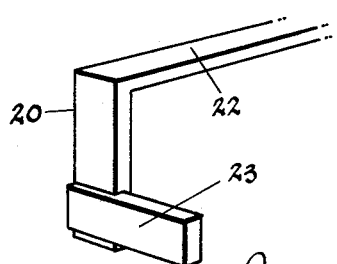
FIG. 3 is a perspective view of one form of electrode that may be used in the practice of this invention.

The preferred electrode, as best shown in FIG. 3, is made up of an angular bar 22 made of an electrically conducting material which is adapted to extend through the walls of the conditioning chamber and extend downwardly into the molten glass. Preferably, this bar is made of a heat-resistant alloy which is satisfactory in operation both above and submerged in the glass. Attached to this lead-in bar is another bar 23 which is completely submerged in the glass while in operating position and it is between the bars 23 of electrodes 20 and 21, as best shown in FIG. 2, that the electricity flows through the molten glass. Preferably, these bars are composed of molybdenum.

Figure 4:
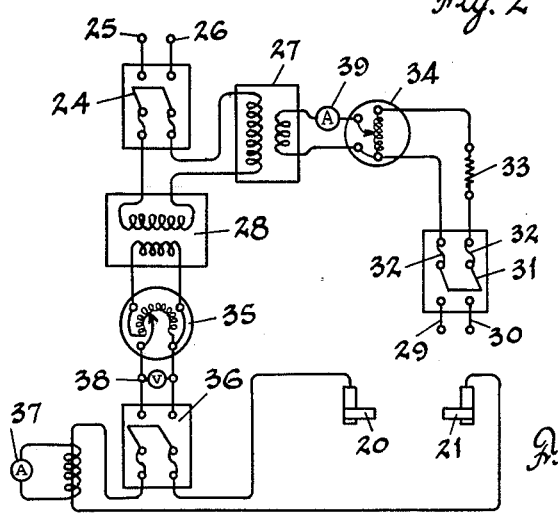
FIG. 4 is a circuit diagram illustrating a means for controlling the amount of electrical energy and thereby controlling the amount of heat being added to the molten glass.

As has been stated, it is particularly important to control the amount of heat added to the glass to provide a uniform temperature at the forming zone, and due to the fact that relatively small amounts of glass are present in the draw pot, it is particularly important to have means for accurately controlling the heat supplied by the electric current flowing between the electrodes 20 and 21. It is well known that as glass gets hotter its electric resistance gets lower so that if a constant voltage is applied between the electrodes, more current would flow as the glass gets hotter thereby causing the glass to heat still faster. For this reason, an automatic controlling circuit is employed to keep the amount of current flowing substantially constant as illustrated in FIG. 4. The circuit consists of a two pole safety switch 24 for disconnecting lead wires 25 and 26, which are connected to a suitable power source. The lead wire 26 is connected to a coil in the saturable reactor 27 with the other end of the coil being connected to the primary coil of the transformer 28, the other lead wire 25 being connected to the other end of the primary coil of the transformer 28. The control coil of the saturable reactor is supplied by lead wires 29 and 30 which are connected to a 125 volt D.C. shop source. A safety switch 31, fuses 32 and fixed resistor 33 are located as shown in the D.C. control circuit. This circuit is led through a potentiometer rheostat 34 and from there into the saturable reactor 27, thereby controlling the amount of current which flows through the primary coil of the transformer 28.

The current which flows through the secondary coil of the transformer 28 is directly proportional to the current flowing through the primary coil which is controlled as hereinbefore set forth. From the secondary coil the current is led through a variac and choke 35 and through the di-pole safety switch 36 to the electrodes 20 and 21. Ammeter 37 and voltmeter 38 are located in the heating circuit so that the electric energy passing into the molten glass may be measured, and ammeter 39 is located in the D.C. control circuit so that the operator may observe the amount of current flowing therethrough.

The control apparatus provides a substantially constant current flow through the glass, and in operation it is usually left at a set position as soon as uniform operating conditions are achieved. If changes in the current are desired, the operator may make the necessary adjustment by appropriately setting the potentiometer 34. It is also contemplated that the potentiometer may be adjused by a suitable thermostat to maintain the desired temperature, but this is not essential.

When the apparatus herein disclosed was installed in a window glass machine similar to the one shown in FIG. 1, it was found that the sheet could be drawn from the draw pot at a more rapid rate and a steadier pull maintained than had been possible before the installation of the controlled heating means of this invention. It was also found that dirt and smear losses were reduced due to the fact that some of the combustion heating was eliminated by being replaced with the heating means of this invention. The increased stability of operation provided better capping and allowed other subsequent production processes to be performed more efficiently. There was also a reduction in clean-ups due to formations of semi-solid gobs of glass in front of the knurls, less knurl troubles, and less clean-up losses. Therefore, it is seen that the controlled heating means of this invention produces a finer grade of window glass with less cost than was achieved by the control means of the prior art.

It is to be understood that the form of the invention disclosed herein is to be taken as the preferred embodiment thereof, and that various changes in the shape, size and arrangement of parts as well as various procedural changes may be resorted to without departing from the spirit of the invention or the scope of the following claims.

We claim:

1. In apparatus for drawing a sheet from a mass of molten glass including a draw pot and a cooling chamber through which a stream of molten glass flows to said draw pot, electric heating means within the cooling chamber and positioned along opposite side walls at the exit end of said cooling chamber for internally heating the edge portions of the stream of molten glass in said cooling chamber and before said molten glass reaches said draw pot.

2. Apparatus as defined in claim 1 in which said cooling chamber includes an arch substantially closing the exit end of said chamber above the stream of molten glass moving therethrough, and said electric heating means are located beneath said arch along opposite side walls thereof.

3. Apparatus as defined in claim 1 in which said electric heating means comprises a pair of electrodes at opposite sides of said cooling chamber with each electrode having a portion thereof submerged in the molten glass and means for controlling the amount of electrical current supplied to said electrodes.

4. An apparatus as defined in claim 3, wherein the distance between electrodes of each pair is within the range of eight inches to eighteen inches.

5. An apparatus as defined in claim 3, wherein the distance between the electrodes of each pair is about twelve inches.

6. Apparatus as defined in claim 3 in which the submerged portions of said electrodes are in the form of bars substantially parallel with the adjacent side wall of said cooling chamber.

7. Apparatus as defined in claim 6 in which said bars are of molybdenum and serve as electrode faces.

8. In a method of drawing a sheet from a mass of molten glass in a draw pot, the steps of flowing a stream of molten glass into said draw pot through a cooling chamber, and heating the edge portions of the molten glass stream in the exit end of said cooling chamber as it flows therethrough along narrow bands at the sides of said stream and substantially parallel with the direction of flow before the molten glass reaches the draw pot.

References Cited in the file of this patent

UNITED STATES PATENTS

| | | |
|---|---|---|
| 1,557,148 | Ferngren | Oct. 3, 1925 |
| 1,610,376 | Hitner | Dec. 14, 1926 |
| 1,781,917 | Drake | Nov. 18, 1930 |
| 1,928,288 | Henry | Sept. 26, 1933 |
| 2,114,715 | Koupal et al. | Apr. 19, 1938 |
| 2,145,677 | Adam | Jan. 31, 1939 |
| 2,274,986 | Kilian et al. | Mar. 3, 1942 |
| 2,348,678 | Rolnick | May 23, 1944 |
| 2,523,030 | Labino | Sept. 19, 1950 |
| 2,658,093 | La Burthe | Nov. 3, 1955 |

FOREIGN PATENTS

| | | |
|---|---|---|
| 440,564 | Great Britain | Dec. 30, 1935 |
| 529,891 | Great Britain | Nov. 29, 1940 |